United States Patent
Jungbluth et al.

(10) Patent No.: US 11,999,567 B2
(45) Date of Patent: Jun. 4, 2024

(54) PICKING DEVICE WITH REMAINING TIME DISPLAY

(71) Applicant: KARDEX PRODUKTION DEUTSCHLAND GMBH, Neuburg/Kammel (DE)

(72) Inventors: Volker Jungbluth, Dortmund (DE); Emmanuel Harder, St. Leon-Rot (DE); Pavel Kraus, Ostrava (CZ); Bohumil Tejnicky, Karvina-Frystat (CZ)

(73) Assignee: KARDEX PRODUKTION DEUTSCHLAND GMBH (DE)

( * ) Notice: Subject to any disclaimer, the term of this patent is extended or adjusted under 35 U.S.C. 154(b) by 20 days.

(21) Appl. No.: 16/767,845

(22) PCT Filed: Apr. 6, 2018

(86) PCT No.: PCT/EP2018/000163
§ 371 (c)(1),
(2) Date: May 28, 2020

(87) PCT Pub. No.: WO2019/120596
PCT Pub. Date: Jun. 27, 2019

(65) Prior Publication Data
US 2020/0307910 A1    Oct. 1, 2020

(30) Foreign Application Priority Data
Dec. 20, 2017  (DE) .................... 10 2017 223 437.7

(51) Int. Cl.
*B65G 1/06*    (2006.01)
*B65G 1/137*   (2006.01)
(Continued)

(52) U.S. Cl.
CPC ............... *B65G 1/06* (2013.01); *B65G 1/137* (2013.01); *G05B 15/02* (2013.01); *G06Q 10/08* (2013.01); *B65G 2209/04* (2013.01)

(58) Field of Classification Search
USPC ......................................... 700/216
See application file for complete search history.

(56) References Cited

U.S. PATENT DOCUMENTS 4,536,759 A * 8/1985 DiMassimo .......... G01R 13/02
345/34
7,801,640 B1  9/2010 Hodge et al.
(Continued)

FOREIGN PATENT DOCUMENTS

CN        1248954        3/2000
CN     201343420 Y      11/2009
(Continued)

OTHER PUBLICATIONS

Superuser.com, Super User Forum Question—"How to properly adjust monitor brightness and contrast", 2013, pp. 1-5. (2013). Retrieved from https://superuser.com/questions/675182/how-to-properly-adjust-monitor-brightness-and-contrast on Sep. 10, 2021 (Year: 2013).*

(Continued)

*Primary Examiner* — Mohammad Ali
*Assistant Examiner* — Joshua T Sanders
(74) *Attorney, Agent, or Firm* — BARNES & THORNBURG LLP; Jeffrey R. Stone

(57) ABSTRACT

The invention refers to a picking device, in particular a storage lift, comprising at least one removal point for storage products and/or storage products carriers. In order to increase the efficiency of the operation of a picking device, it is provided according to the invention that the picking device is connected to at least one remaining time calculat- (Continued)

ing device with which the remaining time until the arrival of a storage product and/or storage product carrier transported in the picking device at the at least one removal point can be calculated, wherein the picking device has at least one display device on which an image that represents the remaining time can be displayed.

11 Claims, 1 Drawing Sheet

(51) Int. Cl.
  *G05B 15/02* (2006.01)
  *G06Q 10/08* (2024.01)

(56) References Cited

U.S. PATENT DOCUMENTS

| | | | |
|---|---|---|---|
| 2012/0271742 A1 | 10/2012 | Solomon | |
| 2014/0154044 A1 | 6/2014 | van Ooyen et al. | |
| 2016/0247113 A1* | 8/2016 | Rademaker | G06Q 10/083 |
| 2019/0004503 A1* | 1/2019 | Ahammer | B65G 43/08 |
| 2019/0147710 A1* | 5/2019 | Carley | H05B 45/20 |
| | | | 340/815.45 |

FOREIGN PATENT DOCUMENTS

| | | | | |
|---|---|---|---|---|
| CN | 101723159 | | 6/2010 | |
| CN | 105584772 | | 5/2016 | |
| CN | 105800223 | A | 7/2016 | |
| CN | 105899446 | | 8/2016 | |
| CN | 107248050 | A | 10/2017 | |
| EP | 2639186 | | 9/2013 | |
| EP | 2639186 | A2 * | 9/2013 | ............ B65G 1/127 |
| JP | 2004054776 | A * | 2/2004 | |
| JP | 2004054776 | | 2/2019 | |
| JP | 6510929 | B2 * | 5/2019 | |
| WO | WO-2017005575 | A1 * | 1/2017 | ........... B66B 1/2466 |
| WO | 2019/166169 | A1 | 9/2019 | |

OTHER PUBLICATIONS

Modula.us, Modula Product Catalog (web)—Options to Improve Productivity—Sliding Console, 2017, pp. 1-2 (2016). Retrieved from https://web.archive.org/web/20161016214517/http://www.modula.us/products/modula-options/options-to-improve-productivity/ on Oct. 9, 2021 (Year: 2016).*
1 Office Action issued by Indian Patent Office in related application No. 202047029868, dated Apr. 15, 2021.
International Search Report issued in PCT/EP2018/000163, dated Sep. 12, 2018.
Chinese Office Action issued in Application No. 201880820064, dated Aug. 26, 2021.

* cited by examiner

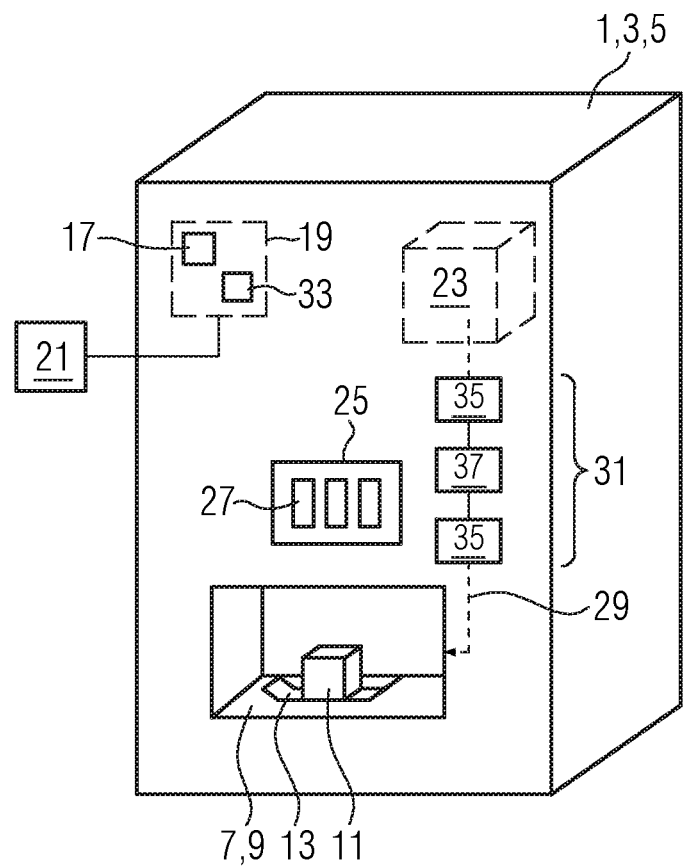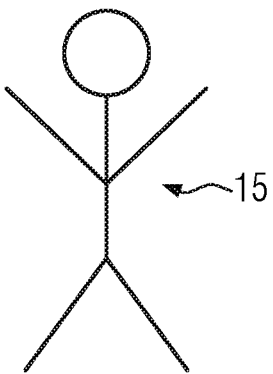

PICKING DEVICE WITH REMAINING TIME DISPLAY

The invention refers to a picking device, in particular a storage lift, comprising at least one removal point for storage products and/or storage products carriers.

Picking devices, especially storage lifts, are well known. Typical examples of picking devices are paternoster storage lifts or circulating storage systems. Such picking devices have removal points which can be accessed, for example, through a service opening. Storage products or storage product carriers which are stored in or transported by the picking device can be automatically transported to the removal point. There they can be removed by operators, so-called pickers. A picking device often has a plurality of removal points. It is also possible that several picking devices together form a storage system, whereby each picking device has at least one removal point.

It is the object of the invention to make picking workflows more efficient.

The object according to the invention is solved for the aforementioned picking device in that the picking device is connected to at least one remaining time calculating device with which the remaining time until the arrival of a storage product and/or storage product carrier transported in the picking device at the at least one removal point can be calculated, wherein the picking device has at least one display device on which an image representing the remaining time can be displayed.

In accordance with the invention, a method is also provided for displaying a remaining time until the arrival of a storage product and/or storage product carrier transported in a picking device at at least one removal point, the remaining time being calculated and displayed in a manner visible from outside the picking device by at least one image representing the remaining time. The method according to the invention also solves the object according to the invention.

The invention makes it possible to increase the efficiency of the operation of a picking device. The remaining time display can be used to inform an operator of how long it will take for storage products to arrive at the removal point. This makes it easier to plan the operator's activities. Other activities, especially near the picking device, can be planned taking into account the remaining time. The operator can then be present in the area of the removal point at the end of the remaining time so that the storage products or storage product carriers arriving there can be removed promptly. In this way, dead times in the operation of picking devices can be avoided. The solution according to the invention supports the operator during the execution of the picking process. The execution of picking is causally linked to the image displayed on at least one display device.

The solution according to the invention can be further improved by different, individually advantageous designs that can be combined with each other in any way. These embodiments and the advantages associated with them are described below. The method according to the invention is feasible with the described designs of the picking device according to the invention. In other words, the advantages described with respect to the picking device according to the invention also apply to the operation of a picking device by means of the method according to the invention. Likewise, the advantages described with regard to the method can be transferred to the picking device according to the invention.

The image representing the remaining time is preferably designed so that it can be intuitively recognized and understood by an operator.

According to a first advantageous design, the at least one display device may have a screen. This allows the remaining time to be displayed in a variety of ways. The screen can also be used to display additional information. A screen of a known screen type can be used. The screen types liquid crystal display (LCD), thin film transistor display (TFT), organic light emitting diode (OLED) and cathode ray tube (CRT) are just a few examples.

Furthermore, it is possible that the at least one display device has a system consisting of a projector and a projection surface. An outer wall of the picking device can be used as a projection surface.

Another advantageous design can be obtained by the fact that the at least one display device has a light-emitting diode matrix (LED array). As with the screen described above, the LED matrix can be controlled in a variety of ways to display the remaining time.

Both in the case of a display by means of a screen and in the case of a display by means of a light-emitting diode matrix, the remaining time can be shown, for example, by a bar display. The number of bars can be proportional to the remaining time, so that a decrease in the number of bars indicates the expiration of the remaining time. Other forms of indication based on the same principle are also possible. For example, the remaining time can be represented by a pie chart, whose sections become fewer as the remaining time passes.

Other display techniques can, of course, also be used for the graphical representation described above in the form of bars or pie charts. For example, illuminated surfaces in the form of bars can also be used. It is also possible that the at least one display device has a plurality of illuminants which can be controlled in such a way that the number of illuminants is proportional to the remaining time.

A further intuitive representation of the remaining time can be obtained by the fact that the at least one display device has at least one light element whose light colour is adjustable. For example, the colour of the light element can be changed when the remaining time has elapsed. A specific colour can be assigned to the immediate arrival of storage products at the removal point. When the remaining time has elapsed, the proportion of this colour is then continuously increased.

The at least one display device may have at least one light element whose brightness is adjustable. For example, the brightness can increase as the remaining time elapses, so that maximum brightness signals the arrival of storage products at the removal point. Alternatively, the brightness may decrease as the remaining time elapses, so that minimum brightness of the light element indicates the arrival of storage products at the removal point. The change in brightness of the light element is preferably continuous. However, it is also possible to control the brightness in steps.

According to another advantageous design, which allows the intuitively display of the remaining time, the at least one display device can have at least one movable mechanical element. Such an element could be a pointer, for example.

Of course, a mechanical element like the pointer mentioned as an example can also be represented only virtually. In particular, at least one of the display devices mentioned above, in particular the screen, may be used to display a mechanical element.

The at least one display device may have at least one numerical display. This allows the remaining time to be displayed directly in the form of a time specification, for example. In particular, the remaining time can be displayed in the form of the remaining seconds until the storage products arrive at the removal point.

The at least one remaining time calculating device can be integrated into the picking device. In particular, the remaining time calculating device may be part of a control device of the picking device. The remaining time calculating device can be implemented as software and/or hardware in the control device. By integrating the remaining time calculating device into the picking device a compact picking device can be obtained.

As an alternative or in addition to the integration of the remaining time calculating device into the picking device, the at least one remaining time calculating device may be part of a control device arranged outside the picking device. Such a control device located outside the picking device can be a computer, in particular a personal computer (PC).

In order to make the calculation of the remaining time simple, the picking device may comprise at least one memory means in which at least one previously known transport time belonging to at least one transport section is stored. Alternatively, the memory means can also be arranged outside the picking device and be connected in a data-transmitting manner to the at least one remaining time calculating device. A transport section is a section of the transport path of storage products or of a storage products carrier between a storage location in the picking device and at least one removal point. In particular, the transport times can be determined empirically and stored in a database or a look-up table. To calculate the remaining time, the transport times stored in the memory means can be totalled for the transport sections through which the storage products are to pass.

The expected remaining time can be calculated alternatively or additionally on the basis of a path/time curve or a transport curve stored in a memory means. For this purpose empirically determined and/or interpolated data can be determined.

The picking device can have at least one position determination device for determining the position of a storage product and/or storage product carrier within the picking device, which is connected in a data-transmitting manner to the at least one remaining time calculating device. By determining the position, the accuracy of the calculation of the remaining time can be improved. In particular, the position of storage products determined by the at least one position determination device can be used as a basis for the calculation of the remaining time described above on the basis of stored transport times or on the basis of a path/time curve.

To further improve the remaining time calculation, the picking device can also have at least one device for speed detection of storage products or storage product carriers during transport.

A simple device for speed detection can be obtained, for example, by two position determination devices spaced apart along the transport path in conjunction with at least one time measuring device. This can be used, for example, to determine the time taken to move storage products from the first position determination device to the second position determination device. The remaining time until the storage products arrive at the removal point can be calculated from the speed determined from this.

Additional times can also be taken into account in the remaining time calculation. Especially waiting times for storage products. This can be the case in particular if there are a plurality of removal points in the picking device. A first storage product can be transported to a first removal point in a first transport process, and then a second storage product can be transported to a second removal point. To calculate the remaining time at the second removal point, it is then advantageous to take into account the waiting time until the first transport process is completed in addition to the transport time. These waiting times can also be stored in a memory means, preferably in the at least one memory means in which the transport times are also stored, if such a memory means is available.

The picking device according to the invention can be improved by providing it with at least one additional removal point. The at least one display device can then indicate at which of the removal points the next storage products will arrive for removal. Alternatively, each of the removal points may be provided with at least one own display device. Then it is possible to display independently for each removal point how much time will elapse until the next storage products arrive. This allows the operator to decide in which order to go to the removal points to remove storage products.

If there are a plurality of removal points, a separate remaining time calculating device may be provided for each of the removal points. Alternatively, a remaining time calculating device can be used to calculate the remaining times for several removal points.

The at least one display device can have at least two fields, each of which is assigned to different removal points and can be activated depending on which of the removal points has the shortest remaining time. By looking at a display device, it is possible to see which of the storage products will be available for pick-up at which removal point.

The display unit according to the invention can also be used to display other information helpful to the operator. For example, the display device can be used to display a destination for storage products to be removed. Only as an example, the possibility is mentioned here that the display device indicates in which container storage products are to be placed after removal. For example, containers can be identified by colour or coloured markings and this colour can be shown on the display unit. In this way the destination of the storage products can be intuitively identified by an operator. This can further increase the efficiency in the operation of the picking device.

In the following, the invention is explained in more detail by means of an advantageous embodiment with reference to the drawing. The combination of features shown as an example in the embodiment can be supplemented by further features for a specific application in accordance with the above explanations. Also, also in accordance with the above explanations, individual features may be omitted from the described embodiment if the effect of this feature in a concrete application is not important.

FIG. 1 shows a schematic, not true to scale, perspective representation of an advantageous embodiment of a picking device according to the invention 1.

The picking device 1 is preferably a storage lift 3, especially a paternoster lift 5.

The picking device 1 is equipped with a removal point 7, which can be located in a service opening 9 of picking device 1. However, the removal point 7 can also be located, for example, on a turntable, at the end of a conveyor belt or on a tilting or swivelling removal device.

At removal point 7, the storage products 11 and/or storage product carriers 13 can be removed from the picking device 1. Only as an example, FIG. 1 shows the storage products 11 on a storage product carrier 13. Preferably, the removal point 7 is arranged in such a way that it can be reached by an operator 15.

The operator 15 can remove the storage products 11 with or without the storage product carrier 13 at the removal point 7 from the picking device 1 and, for example, feed it to a collection container (not shown).

The picking device 1 is connected to a remaining time calculating device 17. Only as an example, the remaining time calculating device 17 is shown as integrated in the picking device 1. Preferably, the remaining time calculating device 17 is part of a control device 19 of the picking device 1, then the remaining time calculating device 17 is part of picking device 1.

The remaining time calculating device 17 can also be part of an external control device 21 arranged outside the picking device 1, which is connected to the picking device 1, in particular to the control device 19, in a data-transmitting manner. The external control device 21 can be a computer, in particular a PC, for example.

The remaining time calculating device 17 is used to calculate the remaining time until a storage product 11 transported in the picking device 1 or a storage product carrier 13 arrives at at least one removal point 7. The remaining time can be calculated, for example, from the time when the storage product 11 or a storage product carrier 13 is transported from a storage location 23 within the picking device 1 to the removal point 7.

Alternatively, other times can be used to calculate the remaining time. For example, the remaining time can be calculated from the time at which a request is sent to control unit 19 to pick up storage products 11.

The picking device 1 has a display device 25 on which an image 27 representing the remaining time can be displayed. Only as an example, FIG. 27 is shown as a bar graph in FIG. 1. The image 27 is preferably chosen so that the remaining time is intuitively recognizable.

The display device 25 is preferably arranged so that it can be viewed by an operator 15 from outside the picking device 1.

The picking device 1 according to the invention can be equipped with at least one additional removal point 7 (not shown). The at least one display device 25 can then indicate at which of the removal points 7 the next storage products 11 will arrive for removal. Alternatively, each of the removal points 7 may be provided with at least one own display device 25. Then for each removal point 7 can be displayed independently of each other how much time will elapse until the next storage product 11 arrives. This allows the operator 15 to decide in which order to go to the removal points 7 to remove the storage products 11.

In FIG. 1, a transport path 29 from storage location 23 to removal point 7 is indicated by a dotted line for illustration purposes only. The transport path 29 can be divided into transport sections. Only one transport section 31 is shown as an example.

The picking device 1 can have at least one memory means 33 in which at least one previously known transport time belonging to at least one transport section 31 is stored. The transport time therefore indicates how long it takes for storage products to pass through section 31 during transport. The transport times can be determined empirically, for example.

It is advantageous if the picking device 1 has at least one, preferably a plurality of, position determination means 35. The position determination means 35 can be used to determine the position of storage products 11 or of a storage product carrier 13 along transport path 29.

The position determination means 35 are preferably connected to the at least one remaining time calculating device 17 by data transmission. The remaining time for the transport of the storage products 11 to the removal point 7 can be easily determined by means of at least one determined position along transport path 29. If, for example, the speed of the transport within picking device 1 is known, the remaining time, i.e. the residual time, can be calculated from the time of passing a position determination means 35.

Alternatively or in addition to this, the speed of storage products on transport path 29 can also be determined. For this purpose, for example, at least two position determination means 35 can be used, whereby in addition to the position determination, the time required for the storage products 11 to travel from one position determination means 35 to the other position determination means 35 is also determined.

Alternatively or in addition, the picking device 1 can also be equipped with at least one means for speed detection 37 of the storage products 11 during transport.

REFERENCE SIGN 1 picking device
3 storage lift
5 paternoster
7 removal point
9 service opening
11 storage products
13 storage product carrier
15 operator
17 remaining time calculating device
19 control device
21 external control device
23 storage location
25 display device
27 image
29 transport path
31 transport section
33 memory means
35 position determination means
37 means for speed detection

The invention claimed is:

1. Picking device, with at least one removal point for storage products and/or storage product carriers,
wherein the picking device is connected to at least one remaining time calculating device, with which the remaining time until the arrival of a storage product and/or storage product carrier transported in the picking device at the at least one removal point can be calculated, and
wherein the picking device has at least one position determination device for determining the position of a stored product and/or storage product carrier within the picking device, which is connected with the at least one remaining time calculation device in a data-transmitting manner, characterized in that the picking device has at least one display device on which a destination for storage products to be removed and an image representing the remaining time can be displayed in real-time, the remaining time being recalculated upon detecting a position and/or speed of a transported storage good along a transport path in the picking device and the at least one display device being updated to display the recalculated time.

2. Picking device according to claim 1, characterised in that the at least one display device comprises at least one screen and/or a light-emitting diode matrix.

3. Picking device according to claim 1, characterised in that the at least one display device comprises at least one light element, the light colour and/or brightness of which is adjustable.

4. Picking device according to claim 1, characterised in that the at least one display device comprises at least one movable mechanical element.

5. Picking device according to claim 1, characterised in that the at least one display device comprises at least one numerical display.

6. Picking device according to claim 1, characterised in that the at least one remaining time calculating device is integrated in the picking device.

7. Picking device according to claim 1, characterised in that the at least one remaining time calculating device is part of a control device arranged outside the picking device.

8. Picking device according to claim 1, characterised by at least one memory in which at least one previously known transport time belonging to at least one transport section is stored.

9. Picking device according to claim 1, characterised by at least one further removal point provided with at least one display device.

10. Picking device according to claim 1, characterised in that a plurality of removal points are provided, wherein a display device is associated with a plurality of removal points.

11. Picking device according to claim 10, the display device comprises at least two fields which are each associated with different removal points and are activated in dependence thereon, at which of the removal points the remaining time is shortest.

* * * * *